United States Patent
Matsumoto et al.

(10) Patent No.: US 9,040,656 B2
(45) Date of Patent: May 26, 2015

(54) PROCESS FOR PRODUCING SPHERICAL PARTICLES OF FURFURYL ALCOHOL RESIN, SPHERICAL PARTICLES OF FURFURYL ALCOHOL RESIN PRODUCED BY THE PROCESS, SPHERICAL CARBON PARTICLES AND SPHERICAL ACTIVATED CARBON PARTICLES

(71) Applicant: Asahi Organic Chemicals Industry Co., LTD., Nobeoka-shi, Miyazaki (JP)

(72) Inventors: Yasuhiro Matsumoto, Aichi (JP); Yuta Murai, Inuyama (JP)

(73) Assignee: Asahi Organic Chemicals Industry Co., Ltd., Nobeoka-Shi (JP)

( * ) Notice: Subject to any disclaimer, the term of this patent is extended or adjusted under 35 U.S.C. 154(b) by 0 days.

(21) Appl. No.: 13/961,349

(22) Filed: Aug. 7, 2013

(65) Prior Publication Data

US 2013/0316178 A1    Nov. 28, 2013

Related U.S. Application Data

(63) Continuation of application No. PCT/JP2012/055210, filed on Mar. 1, 2012.

(30) Foreign Application Priority Data

Mar. 17, 2011 (JP) .................................. 2011-059103

(51) Int. Cl.
| C08G 59/68 | (2006.01) |
| C08F 134/02 | (2006.01) |
| C01B 31/10 | (2006.01) |
| C08G 65/36 | (2006.01) |
| C01B 31/02 | (2006.01) |
| C08G 59/00 | (2006.01) |

(52) U.S. Cl.
CPC ............... *C08F 134/02* (2013.01); *C01B 31/10* (2013.01); *C08G 65/36* (2013.01); *C01B 31/02* (2013.01)

(58) Field of Classification Search
CPC ............................................... C08G 2261/3222
USPC ......................................... 528/408, 486, 400
See application file for complete search history.

(56) References Cited

U.S. PATENT DOCUMENTS

| 3,451,984 | A | 6/1969 | Bourguignon |
| 4,594,287 | A | 6/1986 | Hucke |
| 6,865,068 | B1 | 3/2005 | Murakami et al. |
| 2005/0112114 | A1 | 5/2005 | Sonobe et al. |
| 2011/0142946 | A1 | 6/2011 | Tabata et al. |
| 2012/0225293 | A1 | 9/2012 | Matsumoto |
| 2013/0123095 | A1 | 5/2013 | Matsumoto |

FOREIGN PATENT DOCUMENTS

| CN | 101875490 A1 | 11/2010 |
| JP | 44-026876 | 11/1969 |
| JP | 62-040949 | 2/1987 |
| JP | 09-171826 | 6/1997 |
| JP | 2007-066669 | 3/2007 |
| JP | 2532695 | * 12/2012 |
| WO | 2011/092888 | 8/2011 |
| WO | 2012/017748 | 2/2012 |

OTHER PUBLICATIONS

Taiwan Office Action (Application No. 101107865) dated Jan. 28, 2014.
International Search Report, International Application No. PCT/JP2012/055210, dated May 29, 2012 (4 pages).

* cited by examiner

*Primary Examiner* — Duc Truong
(74) *Attorney, Agent, or Firm* — Burr & Brown, PLLC

(57) ABSTRACT

Providing a process for advantageously producing spherical particles of furfuryl alcohol resin using only furfuryl alcohol without using a harmful aldehyde as a starting material. In the process, furfuryl alcohol is subjected to a self-condensation reaction in the presence of an acid catalyst, whereby a fluidic condensation resin of furfuryl alcohol is obtained. The condensation resin of furfuryl alcohol is granulated and cured using water as a reaction medium in the presence of a dispersion stabilizer and an acid catalyst having a pKa of not more than 1.5, whereby spherical cured resin particles are formed.

15 Claims, No Drawings

PROCESS FOR PRODUCING SPHERICAL PARTICLES OF FURFURYL ALCOHOL RESIN, SPHERICAL PARTICLES OF FURFURYL ALCOHOL RESIN PRODUCED BY THE PROCESS, SPHERICAL CARBON PARTICLES AND SPHERICAL ACTIVATED CARBON PARTICLES

CROSS REFERENCE TO RELATED APPLICATIONS

This application is a continuation of the International Application No. PCT/JP2012/055210, filed Mar. 1, 2012, which claims the benefit under 35 U.S.C. §119(a)-(d) of Japanese Application No. 2011-059103, filed Mar. 17, 2011, the entireties of which are incorporated herein by reference.

BACKGROUND OF THE INVENTION

1. Field of the Invention

The present invention relates to a process for producing spherical particles of furfuryl alcohol resin, spherical particles of furfuryl alcohol resin produced by the process, and spherical activated carbon particles obtained by carbonizing the spherical particles of furfuryl alcohol resin and activating the carbonized spherical particles of furfuryl alcohol resin.

2. Description of Related Art

Spherical resin particles have been used in various fields such as filler, flame retardant, abrasive, pore forming material, spacer, and carbon material precursor, owing to their characteristics. Spherical particles of furan resin, which are one kind of such spherical resin particles, are obtained by using furans as a starting material. For example, JP-A-2007-66669 discloses that the spherical particles of furan resin are produced by reacting furfuryl alcohol with formaldehyde. Although the use of the spherical particles of furan resin as an electrode material of a battery is discussed therein, a harmful substance, i.e., formaldehyde is used as the starting material. Thus, there were inherent problems that careful consideration should be given to production environment as well as the condition of reaction with the furfuryl alcohol.

SUMMARY OF THE INVENTION

The present invention has been made in the light of the background art described above. It is a problem to be solved by the present invention to provide a process for advantageously producing spherical particles of furfuryl alcohol resin by resinifying furfuryl alcohol, using only the furfuryl alcohol without using a harmful aldehyde as the starting material, and then granulating and curing the resinified furfuryl alcohol. Further problems to be solved by the present invention are to provide the spherical particles of furfuryl alcohol resin produced by the process, spherical carbon particles obtained by firing the resin particles, and spherical activated carbon particles obtained by activating the spherical carbon particles.

The inventor of the present invention has conducted intensive studies to solve the above-described problems and found that the spherical particles of furfuryl alcohol resin having an average particle diameter of 1-1500 μm can be advantageously produced without using the harmful aldehyde as the starting material, by subjecting the furfuryl alcohol to a self-condensation reaction using an acid catalyst to prepare a condensation resin of furfuryl alcohol, granulating the condensation resin of furfuryl alcohol in the presence of a dispersion stabilizer and an acid catalyst having a pKa of not more than 1.5, and curing the granulated condensation resin by a three-dimensional cross-linking reaction. The present inventor has conducted further studies based on the above-described finding and eventually completed the present invention.

The present invention was made based on the above-described finding. According to a first aspect of the present invention, there is provided a process for producing spherical particles of furfuryl alcohol resin, comprising the steps of: obtaining a fluidic condensation resin of furfuryl alcohol by subjecting furfuryl alcohol to a self-condensation reaction in the presence of an acid catalyst; and obtaining spherical particles of a cured resin by granulating and curing the condensation resin of furfuryl alcohol, using water as a reaction medium in the presence of a dispersion stabilizer and an acid catalyst having a pKa of not more than 1.5.

According to one preferable form of the process of the present invention, the acid catalyst used in the self-condensation reaction has a pKa of less than 8, and is used in an amount of 0.1-50% by mass with respect to the furfuryl alcohol. The obtained condensation resin of furfuryl alcohol has a weight-average molecular weight of 150-100000. The dispersion stabilizer is used in an amount of 0.01-100% by mass with respect to the furfuryl alcohol used in the self-condensation reaction. As the dispersion stabilizer, a protective colloid or a surfactant is advantageously used. As the protective colloid, at least one of hydroxyethyl cellulose, partially hydrolyzed polyvinyl alcohol, and gum arabic is advantageously used.

According to other preferable form of the process of the present invention, not more than 25 times by mass of water with respect to the furfuryl alcohol is used as a reaction medium in the self-condensation reaction. It is preferable that a reaction temperature employed for the self-condensation reaction is not lower than 30° C.

According to another preferable form of the process of the present invention, the acid catalyst having a pKa of not more than 1.5 is used in an amount of 0.05-100% by mass with respect to the furfuryl alcohol used in the self-condensation reaction. Advantageously, the acid catalyst having a pKa of not more than 1.5 is benzenesulfonic acid, and particularly preferably, it is alkylbenzene sulfonic acid. It is advantageous that water is used as the reaction medium in an amount of 0.5-25 times by mass with respect to the furfuryl alcohol used in the self-condensation reaction. It is preferable that a reaction temperature employed for curing is not lower than 50° C.

According to the present invention, spherical particles of furfuryl alcohol resin having an average particle diameter of 1-1500 m can be advantageously obtained. Further, spherical carbon particles can be advantageously obtained by firing such spherical resin particles, and spherical activated carbon particles can be effectively produced by activating the obtained spherical carbon particles.

According to the present invention, it is possible to easily produce the spherical particles of furfuryl alcohol resin having an average particle diameter in a wide range of 1-1500 μm without using the harmful aldehyde as the starting material. Thus, the spherical particles of furfuryl alcohol resin can be industrially advantageously provided.

In the present invention, cured spherical particles are obtained by subjecting the furfuryl alcohol alone to the self-condensation reaction to prepare the condensation resin of furfuryl alcohol, granulating the prepared condensation resin or forming the condensation resin into particles, and subjecting the granulated condensation resin to the three-dimensional cross-linking (curing) reaction through cleavage of furan ring, whereby the furfuryl alcohol resin particles can be industrially advantageously provided. Further, the carbon particles and the activated carbon particles obtained by carbonizing and activating the spherical resin particles can be used for various applications.

DETAILED DESCRIPTION OF THE INVENTION

In the production of the desired spherical particles of furfuryl alcohol resin according to the process of the present invention, a condensation resin of furfuryl alcohol is prepared by subjecting a furfuryl alcohol monomer to a self-condensation reaction in the presence of an appropriate acid catalyst. The condensation resin of furfuryl alcohol is granulated or formed into particles using water as a reaction medium in the presence of a dispersion stabilizer and a specific acid catalyst having a pKa of not more than 1.5, and is heated for curing. Then, a liquid reaction product containing the produced cured resin particles is filtered and purified to advantageously obtain the spherical particles of furfuryl alcohol resin having an average particle diameter of 1-1500 μm.

In the preparation of the condensation resin of furfuryl alcohol, the furfuryl alcohol is subjected to the self-condensation reaction so as to obtain the condensation resin having furan rings which are linearly connected by methylene bonds or dimethylene ether bonds. The obtained condensation resin of furfuryl alcohol is fluidic and soluble (dissoluble) in a solvent at the room or an elevated temperature. Following the self-condensation reaction, the condensation resin is cured by the three-dimensional cross-linking reaction through cleavage of furan rings, whereby a resin is obtained as an end product which does not dissolve or melt at an elevated temperature and which is insoluble in any solvent.

In the present invention, an acid catalyst is used for the self-condensation reaction (preparation of the condensation resin) of the furfuryl alcohol as the material monomer. The kind of the catalyst is not limited as long as it is an acid catalyst, and any conventionally known acid may be used. In order to advantageously achieve objects of the present invention, an acid catalyst having a pKa of less than 8 is preferably used, and more preferably, an acid catalyst having a pKa of about 1-5 is used.

More specifically described, examples of the acid catalyst (a) for preparing the condensation resin of furfuryl alcohol by the self-condensation reaction include inorganic acids such as sulfuric acid, hydrochloric acid, nitric acid, phosphorous acid, and phosphoric acid; and organic acids such as trifluoroacetic acid, methanesulfonic acid, benzenesulfonic acid, para toluene sulfonic acid, phenolsulfonic acid, decylbenzene sulfonic acid, dodecylbenzene sulfonic acid, tetradecyl benzene sulfonic acid, hexadecyl benzene sulfonic acid, octadecyl benzene sulfonic acid, sulfanilic acid, oxalic acid, salicylic acid, maleic acid, pyruvic acid, malonic acid, fumaric acid, citric acid, tartaric acid, malic acid, lactic acid, benzoic acid, ascorbic acid, acetic acid, and propionic acid. Any one of, or any combination of the above-indicated acid catalysts may be used.

The amount of the acid catalyst (a) is suitably determined depending on the condition of the reaction with the furfuryl alcohol. The acid catalyst (a) is generally used in an amount of about 0.1-50% by mass, preferably about 0.15-10% by mass, and more preferably about 0.2-5% by mass of the furfuryl alcohol. When the acid catalyst is used in an amount of less than the above-indicated lower limit, the objects of the present invention may not be sufficiently achieved. On the other hand, when the acid catalyst is used in an amount of more than the above-indicated upper limit, it becomes difficult to control the reaction, giving rise to problems such as increased difficulty of obtaining the fluidic condensation resin of furfuryl alcohol. Although the self-condensation reaction (preparation of the condensation resin) can take place by applying heat without adding the acid catalyst (a), in the present invention, the acid catalyst is advantageously added to reduce the reaction time and improve the reaction efficiency.

Further, the self-condensation reaction (preparation of the condensation resin) of the furfuryl alcohol can be advantageously effected in the presence of water as well as the above-described acid catalyst (a) in order to stabilize the reaction. Water is generally used in an amount of about 0-25 times by mass, preferably about 0-10 times by mass, and more preferably about 0.5-5 times by mass of the furfuryl alcohol.

The reaction temperature of the self-condensation reaction for preparing the condensation resin of furfuryl alcohol according to the present invention is not particularly limited as long as the self-condensation reaction can take place. However, in view of the reaction efficiency, the self-condensation reaction is generally conducted at a temperature of not lower than 30° C., preferably not lower than 40° C., and more preferably not lower than 50° C., to prepare the condensation resin of furfuryl alcohol. The reaction time of the self-condensation reaction is suitably determined in view of the reaction conditions such as the above-described reaction temperature, the amount of water in the reaction system and the degree of condensation of the reaction product. Generally, a reaction time of about 0.1-50 hours is required for the reaction to prepare the condensation resin.

In the present invention, the condensation resin of furfuryl alcohol which is prepared by the above-described self-condensation reaction and then subjected to the curing reaction is not particularly limited as long as it is prepared by the self-condensation reaction of the furfuryl alcohol and fluidic and soluble in a suitable solvent. Generally, a condensation resin of furfuryl alcohol having a weight-average molecular weight of about 150-100000, and more preferably 250-10000 is used. A weight-average molecular weight higher than the above-indicated upper limit increases viscosity of the condensation resin, giving rise to problems that spherical particles cannot be formed due to difficulty of uniform shearing and stirring when the condensation resin is granulated in the curing reaction using water as the reaction medium, for example.

In the present invention, the condensation resin obtained by the above-described self-condensation reaction of the furfuryl alcohol is cured by the three-dimensional cross-linking reaction. As an acid catalyst for curing the condensation resin of furfuryl alcohol by the three-dimensional cross-linking reaction, an acid catalyst (b) having a pKa of not more than 1.5 is used. The use of the acid catalyst (b) having the pKa of not more than 1.5 effectively causes the three-dimensional cross-linking reaction, making it possible to advantageously produce the spherical particles having an average particle diameter in a wide range of 1-1500 μm. An acid catalyst having a pKa of more than 1.5 gives rise to problems such as insufficient curing of the condensation resin by the three-dimensional cross-linking reaction, and increased difficulty of effectively granulating the resin or forming the resin into particles.

Specific examples of the acid catalyst (b) for curing, which have the pKa of not more than 1.5, include hydrochloric acid, sulfuric acid, nitric acid, oxalic acid, trifluoroacetic acid, methanesulfonic acid, benzenesulfonic acid, para toluene sulfonic acid, phenolsulfonic acid, decylbenzene sulfonic acid, dodecylbenzene sulfonic acid, tetradecyl benzene sulfonic acid, hexadecyl benzene sulfonic acid, and octadecyl benzene sulfonic acid. Any one of, or any combination of the above-described acid catalysts may be used. Among the above-described acid catalysts, the benzene sulfonic acid, especially alkylbenzene sulfonic acid having an alkyl group is preferably used. In view of economic efficiency, availability and catalytic function, it is especially recommended to use the dodecylbenzene sulfonic acid.

The amount of the acid catalyst (b) is suitably determined depending on the condition of the reaction with the condensation resin of furfuryl alcohol, and further depending on the kind of the dispersion stabilizer. The acid catalyst (b) is generally used in an amount of about 0.05-100% by mass, preferably about 0.1-50% by mass, and more preferably about 0.2-5% by mass, with respect to the amount of the furfuryl alcohol used for the preparation of the condensation resin. When the acid catalyst (b) is used in an amount of less than the above-indicated lower limit, the objects of the present invention may not be sufficiently achieved. On the other hand, when the acid catalyst (b) is used in an amount of more than the above-indicated upper limit, there arises a problem that control of the reaction is difficult, for example.

In the present invention, a suitable dispersion stabilizer is used to effectively granulate the condensation resin of furfuryl alcohol in water used as the reaction medium for curing the condensation resin. The dispersion stabilizer is added for the purpose of granulating the furfuryl alcohol resin (forming the furfuryl alcohol resin into particles) so as to obtain the spherical particles of furfuryl alcohol resin. The kind of the dispersion stabilizer is not particularly limited, and any conventionally known dispersion stabilizer may be used. As the dispersion stabilizer which makes it possible to advantageously achieve the objects of the present invention, a protective colloid or a surfactant is preferably used, and more preferably, the protective colloid is advantageously used.

Examples of the protective colloid include gum arabic, gum ghatti, hydroxyalkyl guar gum, partially hydrolyzed polyvinyl alcohol, polyvinylpyrrolidone, polyvinyl acetate, hydroxyethyl cellulose, hydroxypropyl cellulose, hydroxyethyl propyl cellulose, and carboxymethylcellulose. Among them, the hydroxyethyl cellulose, partially hydrolyzed polyvinyl alcohol, and gum arabic are preferably used. Examples of the surfactants include anionic surfactants such as alkyl sulfates, polyoxyethylene alkyl ether sulfates and fatty acid salts, cationic surfactants such as quaternary ammonium salts and fatty acid amide amines, and nonionic surfactants such as sorbitan fatty acid esters and polyoxyalkylene polyethers. Preferably, the nonionic surfactants are used.

Any one of, or any combination of the above-described protective colloids and surfactants may be used as the dispersion stabilizer. Further, the surfactant may be used together with the protective colloid. Although an amount of the dispersion stabilizer is suitably determined depending on the kind of the protective colloid and the surfactant to be used, the dispersion stabilizer is generally used in an amount of about 0.01-100% by mass, preferably about 0.05-10% by mass, and more preferably about 0.1-5% by mass, with respect to the furfuryl alcohol used for the preparation of the condensation resin.

Further, the amount of water used as the reaction medium for the curing (cross-linking) reaction of the condensation resin of furfuryl alcohol is suitably determined depending on the reaction condition and the like. In order to effectively obtain the intended spherical particles of furfuryl alcohol resin, water is generally used in an amount of about 0.5-25 times by mass, and preferably about 1-10 times by mass with respect to the amount of the furfuryl alcohol used for the preparation of the condensation resin. In the case where water is used as the reaction medium for the preparation of the condensation resin, and the curing reaction is successively conducted after the preparation of the condensation resin, the water used in the preparation of the condensation resin may be used for the curing reaction. It is possible to add water at the time of the curing reaction. In this case, the amount of water used in the curing reaction is adjusted within the above-indicated range with respect to the total amount of the water used in the preparation of the condensation resin and the water added at the time of the curing reaction. An amount of water less than 0.5 time by mass with respect to the furfuryl alcohol gives rise to problems such as agglomeration of the reaction product. An amount of water more than 25 times by mass with respect to the furfuryl alcohol gives rise to problems such as low volume efficiency and excessively long reaction time, resulting in reduction of the economic efficiency.

In view of the reaction efficiency, the curing (cross-linking) reaction of the condensation resin of furfuryl alcohol according to the present invention is generally conducted at a temperature of not lower than 50° C., preferably not lower than 70° C., and more preferably not lower than 80° C., in order to form the resin into particles.

The reaction time of the curing (cross-linking) reaction of the condensation resin of furfuryl alcohol according to the present invention is suitably determined in view of the reaction conditions such as the reaction temperature, the amount of water in the reaction system, and the degree of condensation and curing of the reaction product. Generally, about 0.5-25 hours is required for the curing reaction.

The spherical particles of furfuryl alcohol resin according to the present invention are advantageously obtained as the spherical particles having an average particle diameter of not smaller than 1 μm and not larger than 1500 μm, by subjecting the furfuryl alcohol to the self-condensation reaction, granulating the obtained condensation resin, curing the granulated condensation resin by the three-dimensional cross-linking reaction, and filtering and purifying the liquid reaction product containing the produced cured resin particles. Particularly, the granulation and curing (cross-linking) reaction of the condensation resin of furfuryl alcohol are conducted using the specific acid catalyst (b) and the dispersion stabilizer in the presence of water as the reaction medium. Accordingly, it is possible to advantageously obtain the cured resin particles having a large particle diameter, and effectively obtain the particles having a wide range of particle diameter.

The thus obtained spherical particles of furfuryl alcohol resin according to the present invention are fired by various conventionally known processes, whereby spherical carbon particles are advantageously provided. For example, the resin particles are carbonized at a temperature of 400-850° C. in a nitrogen atmosphere using an externally heated rotary furnace, whereby the intended spherical carbon particles are advantageously produced.

Further, the spherical carbon particles are subjected to an appropriate activation process to form intended spherical activated carbon particles. The activation process of the spherical carbon particles may be conducted according to a conventional process. For example, gas activation or chemical activation is conducted at a temperature of 500-1000° C. to advantageously form the intended activated carbon particles. This activation step may be successively conducted after the above-described carbonization step, or may be conducted in a separate step.

EXAMPLES

To further clarify the present invention, some examples of the invention will be described. It is to be understood that the present invention is not limited to the details of the illustrated examples and foregoing description, but may be embodied with various changes, modifications, and improvements, which may occur to those skilled in the art without departing from the spirit and scope of the invention. An average particle diameter and an actual carbon ratio of the spherical particles of furfuryl alcohol resin and a specific surface area of the spherical activated carbon particles of the following examples were evaluated in accordance with the following methods.

(1) Molecular Weight

A molecular weight was determined by a weight-average molecular weight which was obtained using HLC-8320GPC (column:G1000HXL+G2000HXL; detector:RI; carrier:1 ml/min of tetrahydrofuran; column temperature:38° C.). manufactured by Tosoh Corporation, and which was calibrated with standard polystyrene.

(2) Average Particle Diameter

An average particle diameter was measured as a volume average diameter ($D_{50}$) using a "Microtrac" particle size distribution analyzer: MT3200II, manufactured by NIKKISO Co., Ltd.

(3) Actual Carbon Ratio

An actual carbon ratio (or carbonization yield) was calculated by the amount of weight change of the spherical particles of furfuryl alcohol resin after carbonization using an externally heated rotary kiln.

(4) Specific Surface Area

A specific surface area was measured using BELSORP-mini manufactured by BEL Japan, Inc.

Example 1

A reaction vessel equipped with a thermometer, a stirring device, and a reflux condenser was charged with 0.15 part by mass of dodecylbenzene sulfonic acid (pKa=−2) as the acid catalyst (a) for resinification, 80 parts by mass of water, and 100 parts by mass of furfuryl alcohol. While the contents in the reaction vessel were stirred, the contents were heated to a temperature of 80° C. so as to cause a reaction for one hour, and then heated to a temperature of 90° C. so as to cause a further reaction for one hour (self-condensation reaction), whereby a condensation resin of furfuryl alcohol having a weight-average molecular weight of 6700 was obtained. Then, 10 parts by mass of a 5% aqueous solution of gum arabic, 2.5 parts by mass of a 10% aqueous solution of dodecylbenzene sulfonic acid (pKa=−2) as the acid catalyst (b) for curing, and 8.25 parts by mass of water were added to the reaction product in the reaction vessel. While the contents in the reaction vessel were stirred for granulation, the contents were heated to a temperature of 95° C. so as to cause a reaction for three hours (curing reaction). After the reaction, the contents in the reaction vessel were cooled to the room temperature. Then, the contents were filtered, purified, and dried to obtain the intended furfuryl alcohol resin particles. Then, it was confirmed through a SEM photograph that the obtained resin particles were spherical, and the volume average diameter ($D_{50}$) of the obtained spherical resin particles was measured. The measured value is shown in Table 1 given below.

The obtained spherical particles of furfuryl alcohol resin were carbonized by heating the spherical particles at a temperature of 800° C. for 30 minutes in a nitrogen atmosphere using the externally heated rotary kiln. Thereafter, the obtained spherical carbon particles were activated at a temperature of 900° C. for four hours in an atmosphere of nitrogen and water vapor, using the externally heated rotary kiln, whereby spherical activated carbon particles were obtained. Then, the actual carbon ratio of the spherical particles of furfuryl alcohol resin and the specific surface area of the spherical activated carbon particles were measured. The measured values are shown in Table 1.

Example 2

A reaction vessel equipped with a thermometer, a stirring device, and a reflux condenser was charged with 0.2 part by mass of oxalic acid (pKa=1.2), 80 parts by mass of water, and 100 parts by mass of furfuryl alcohol. While the contents in the reaction vessel were stirred, the contents were heated to a temperature of 80° C. so as to cause a reaction for two hours (self-condensation reaction), whereby a condensation resin of furfuryl alcohol having a weight-average molecular weight of 570 was obtained. Then, 40 parts by mass of the 5% aqueous solution of gum arabic, 15 parts by mass of a 10% aqueous solution of para toluene sulfonic acid (pKa=−2.8), and 18.5 parts by mass of water were added to the reaction product in the reaction vessel to compose a reaction system. While the contents in the reaction vessel were stirred for granulation, the contents were heated to a temperature of 95° C. so as to cause a reaction for three hours (curing reaction). After the reaction, the contents in the reaction vessel were cooled to the room temperature. Then, the contents were filtered, purified, and dried to obtain the intended furfuryl alcohol resin particles. Then, it was confirmed through a SEM photograph that the obtained resin particles were spherical, and the volume average diameter ($D_{50}$) of the obtained spherical resin particles was measured. The measured value is shown in Table 1.

The obtained spherical particles of furfuryl alcohol resin were carbonized as in the case of Example 1. Thereafter, the obtained spherical carbon particles were activated by steam, whereby spherical activated carbon particles were obtained. Then, the actual carbon ratio of the spherical particles of furfuryl alcohol resin and the specific surface area of the spherical activated carbon particles were measured. The measured values are shown in Table 1.

Example 3

A reaction vessel equipped with a thermometer, a stirring device, and a reflux condenser was charged with 0.2 part by mass of oxalic acid (pKa=1.2), 80 parts by mass of water, and 100 parts by mass of furfuryl alcohol. While the contents in the reaction vessel were stirred, the contents were heated to a temperature of 80° C. so as to cause a reaction for two hours (self-condensation reaction), whereby a condensation resin of furfuryl alcohol having a weight-average molecular weight of 570 was obtained. Then, 1 part by mass of the 5% aqueous solution of gum arabic, 2.5 parts by mass of the 10% aqueous solution of dodecylbenzene sulfonic acid (pKa=−2), and 16.8 parts by mass of water were added to the reaction product in the reaction vessel. While the contents in the reaction vessel were stirred for granulation, the contents were heated to a temperature of 95° C. so as to cause a reaction for three hours (curing reaction). After the reaction, the contents in the reaction vessel were cooled to the room temperature. Then, the contents were filtered, purified, and dried to obtain the intended furfuryl alcohol resin particles. Then, it was confirmed through a SEM photograph that the obtained resin particles were spherical, and the volume average diameter ($D_{50}$) of the obtained spherical resin particles was measured. The measured value is shown in Table 1.

The obtained spherical particles of furfuryl alcohol resin were carbonized as in the case of Example 1. Thereafter, the obtained spherical carbon particles were activated by steam, whereby spherical activated carbon particles were obtained. Then, the actual carbon ratio of the spherical particles of furfuryl alcohol resin and the specific surface area of the spherical activated carbon particles were measured. The measured values are shown in Table 1.

Example 4

A reaction vessel equipped with a thermometer, a stirring device, and a reflux condenser was charged with 0.2 part by mass of oxalic acid (pKa=1.2), 80 parts by mass of water, and 100 parts by mass of furfuryl alcohol. While the contents in the reaction vessel were stirred, the contents were heated to a temperature of 80° C. so as to cause a reaction for two hours (self-condensation reaction), whereby a condensation resin of furfuryl alcohol having a weight-average molecular weight of 570 was obtained. Then, 0.8 part by mass of the 5% aqueous solution of gum arabic, 5 parts by mass of the 10% aqueous solution of dodecylbenzene sulfonic acid (pKa=-2), and 14.74 parts by mass of water were added to the reaction product in the reaction vessel. While the contents in the reaction vessel were stirred for granulation, the contents were heated to a temperature of 95° C. so as to cause a reaction for three hours (curing reaction). After the reaction, the contents in the reaction vessel were cooled to the room temperature. Then, the contents were filtered, purified, and dried to obtain the intended furfuryl alcohol resin particles. Then, it was confirmed through a SEM photograph that the obtained resin particles were spherical, and the volume average diameter ($D_{50}$) of the obtained spherical resin particles was measured. The measured value is shown in Table 1.

The obtained spherical particles of furfuryl alcohol resin were carbonized as in the case of Example 1. Thereafter, the obtained spherical carbon particles were activated by steam, whereby spherical activated carbon particles were obtained. Then, the actual carbon ratio of the spherical particles of furfuryl alcohol resin and the specific surface area of the spherical activated carbon particles were measured. The measured values are shown in Table 1.

Example 5

A reaction vessel equipped with a thermometer, a stirring device, and a reflux condenser was charged with 0.2 part by mass of oxalic acid (pKa=1.2), 80 parts by mass of water, and 100 parts by mass of furfuryl alcohol. While the contents in the reaction vessel were stirred, the contents were heated to a temperature of 80° C. so as to cause a reaction for 0.5 hour (self-condensation reaction), whereby a condensation resin of furfuryl alcohol having a weight-average molecular weight of 350 was obtained. Then, 20 parts by mass of the 5% aqueous solution of gum arabic, 10 parts by mass of the 10% aqueous solution of dodecylbenzene sulfonic acid (pKa=-2), and 392 parts by mass of water were added to the reaction product in the reaction vessel. While the contents in the reaction vessel were stirred for granulation, the contents were heated to a temperature of 95° C. so as to cause a reaction for three hours (curing reaction). After the reaction, the contents in the reaction vessel were cooled to the room temperature. Then, the contents were filtered, purified, and dried to obtain the intended furfuryl alcohol resin particles. Then, it was confirmed through a SEM photograph that the obtained resin particles were spherical, and the volume average diameter ($D_{50}$) of the obtained spherical resin particles was measured. The measured value is shown in Table 1.

The obtained spherical particles of furfuryl alcohol resin were carbonized as in the case of Example 1. Thereafter, the obtained spherical carbon particles were activated by steam, whereby spherical activated carbon particles were obtained. Then, the actual carbon ratio of the spherical particles of furfuryl alcohol resin and the specific surface area of the spherical activated carbon particles were measured. The measured values are shown in Table 1.

Example 6

A reaction vessel equipped with a thermometer, a stirring device, and a reflux condenser was charged with 0.2 part by mass of oxalic acid (pKa=1.2), 80 parts by mass of water, and 100 parts by mass of furfuryl alcohol. While the contents in the reaction vessel were stirred, the contents were heated to a temperature of 80° C. so as to cause a reaction for two hours (self-condensation reaction), whereby a condensation resin of furfuryl alcohol having a weight-average molecular weight of 570 was obtained. Then, 20 parts by mass of a 5% aqueous solution of hydroxyethyl cellulose, 2.5 parts by mass of the 10% aqueous solution of dodecylbenzene sulfonic acid (pKa=-2), and 8.75 parts by mass of water were added to the reaction product in the reaction vessel to compose a reaction system. While the contents in the reaction vessel were stirred for granulation, the contents were heated to a temperature of 95° C. so as to cause a reaction for three hours (curing reaction). After the reaction, the contents in the reaction vessel were cooled to the room temperature. Then, the contents were filtered, purified, and dried to obtain the intended furfuryl alcohol resin particles. Then, it was confirmed through a SEM photograph that the obtained resin particles were spherical, and the volume average diameter ($D_{50}$) of the obtained spherical resin particles was measured. The measured value is shown in Table 1.

The obtained spherical particles of furfuryl alcohol resin were carbonized as in the case of Example 1. Thereafter, the obtained spherical carbon particles were activated by steam, whereby spherical activated carbon particles were obtained. Then, the actual carbon ratio of the spherical particles of furfuryl alcohol resin and the specific surface area of the spherical activated carbon particles were measured. The measured values are shown in Table 1.

Example 7

A reaction vessel equipped with a thermometer, a stirring device, and a reflux condenser was charged with 0.2 part by mass of oxalic acid (pKa=1.2), 80 parts by mass of water, and 100 parts by mass of furfuryl alcohol. While the contents in the reaction vessel were stirred, the contents were heated to a temperature of 80° C. so as to cause a reaction for two hours (self-condensation reaction), whereby a condensation resin of furfuryl alcohol having a weight-average molecular weight of 570 was obtained. Then, 20 parts by mass of a 5% aqueous solution of polyvinyl alcohol, 2.5 parts by mass of the 10% aqueous solution of dodecylbenzene sulfonic acid (pKa=-2), and 8.75 parts by mass of water were added to the reaction product in the reaction vessel to compose a reaction system. While the contents in the reaction vessel were stirred for granulation, the contents were heated to a temperature of 95° C. so as to cause a reaction for three hours (curing reaction). After the reaction, the contents in the reaction vessel were cooled to the room temperature. Then, the contents were filtered, purified, and dried to obtain the intended furfuryl alcohol resin particles. Then, it was confirmed through a SEM photograph that the obtained resin particles were spherical, and the volume average diameter ($D_{50}$) of the obtained spherical resin particles was measured. The measured value is shown in Table 1.

The obtained spherical particles of furfuryl alcohol resin were carbonized as in the case of Example 1. Thereafter, the obtained spherical carbon particles were activated by steam, whereby the spherical activated carbon particles were obtained. Then, the actual carbon ratio of the spherical particles of furfuryl alcohol resin and the specific surface area of the spherical activated carbon particles were measured. The measured values are shown in Table 1.

Example 8

A reaction vessel equipped with a thermometer, a stirring device, and a reflux condenser was charged with 0.2 part by mass of oxalic acid (pKa=1.2), 100 parts by mass of furfuryl alcohol, and 80 parts by mass of water. While the contents in the reaction vessel were stirred, the contents were heated to a temperature of 80° C. so as to cause a reaction for 0.25 hour (self-condensation reaction), whereby a condensation resin of furfuryl alcohol having a weight-average molecular weight of 250 was obtained. Then, 40 parts by mass of a nonionic polyether surfactant (Pionin D409 available from TAKEMOTO OIL&FAT CO., LTD.), 200 parts by mass of the 10% aqueous solution of dodecylbenzene sulfonic acid (pKa=−2), and 240 parts by mass of water were added to the reaction product in the reaction vessel. While the contents in the reaction vessel were stirred for granulation, the contents were heated to a temperature of 95° C. so as to cause a reaction for five hours (curing reaction). After the reaction, the contents in the reaction vessel were cooled to the room temperature. Then, the contents were filtered, purified, and dried to obtain the intended furfuryl alcohol resin particles. Then, it was confirmed through a SEM photograph that the obtained resin particles were spherical, and the volume average diameter ($D_{50}$) of the obtained spherical resin particles was measured. The measured value is shown in Table 1.

The obtained spherical particles of furfuryl alcohol resin were carbonized as in the case of Example 1. Thereafter, the obtained spherical carbon particles were activated by steam, whereby spherical activated carbon particles were obtained. Then, the actual carbon ratio of the spherical particles of furfuryl alcohol resin and the specific surface area of the spherical activated carbon particles were measured. The measured values are shown in Table 1.

Example 9

A reaction vessel equipped with a thermometer, a stirring device, and a reflux condenser was charged with 0.56 part by mass of 89% phosphoric acid (pKa=2.2), 79.94 parts by mass of water, and 100 parts by mass of furfuryl alcohol. While the contents in the reaction vessel were stirred, the contents were heated to a temperature of 80° C. so as to cause a reaction for two hours (self-condensation reaction), whereby a condensation resin of furfuryl alcohol having a weight-average molecular weight of 450 was obtained. Then, 10 parts by mass of the 5% aqueous solution of gum arabic, 2.5 parts by mass of the 10% aqueous solution of dodecylbenzene sulfonic acid (pKa=−2), and 8.25 parts by mass of water were added to the reaction product in the reaction vessel. While the contents in the reaction vessel were stirred for granulation, the contents were heated to a temperature of 95° C. so as to cause a reaction for three hours (curing reaction). After the reaction, the contents in the reaction vessel were cooled to the room temperature. Then, the contents were filtered, purified, and dried to obtain the intended furfuryl alcohol resin particles. Then, it was confirmed through a SEM photograph that the obtained resin particles were spherical, and the volume average diameter ($D_{50}$) of the obtained spherical resin particles was measured. The measured value is shown in Table 1.

The obtained spherical particles of furfuryl alcohol resin were carbonized as in the case of Example 1. Thereafter, the obtained spherical carbon particles were activated by steam, whereby spherical activated carbon particles were obtained. Then, the actual carbon ratio of the spherical particles of furfuryl alcohol resin and the specific surface area of the spherical activated carbon particles were measured. The measured values are shown in Table 1.

Example 10

A reaction vessel equipped with a thermometer, a stirring device, and a reflux condenser was charged with 3 parts by mass of acetic acid (pKa=4.8), 80 parts by mass of water, and 100 parts by mass of furfuryl alcohol. While the contents in the reaction vessel were stirred, the contents were heated to a temperature of 90° C. so as to cause a reaction for three hours (self-condensation reaction), whereby a condensation resin of furfuryl alcohol having a weight-average molecular weight of 400 was obtained. Then, 10 parts by mass of the 5% aqueous solution of gum arabic, 2.5 parts by mass of the 10% aqueous solution of dodecylbenzene sulfonic acid (pKa=−2), and 8.25 parts by mass of water were added to the reaction product in the reaction vessel to compose a reaction system. While the contents in the reaction vessel were stirred for granulation, the contents were heated to a temperature of 95° C. so as to cause a reaction for three hours (curing reaction). After the reaction, the contents in the reaction vessel were cooled to the room temperature. Then, the contents were filtered, purified, and dried to obtain the intended furfuryl alcohol resin particles. Then, it was confirmed through a SEM photograph that the obtained resin particles were spherical, and the volume average diameter ($D_{50}$) of the obtained spherical resin particles was measured. The measured value is shown in Table 1.

The obtained spherical particles of furfuryl alcohol resin were carbonized as in the case of Example 1. Thereafter, the obtained spherical carbon particles were activated by steam, whereby spherical activated carbon particles were obtained. Then, the actual carbon ratio of the spherical particles of furfuryl alcohol resin and the specific surface area of the spherical activated carbon particles were measured. The measured values are shown in Table 1.

Comparative Example 1

A reaction vessel equipped with a thermometer, a stirring device, and a reflux condenser was charged with 80 parts by mass of water and 100 parts by mass of furfuryl alcohol. While the contents in the reaction vessel were stirred, the contents were heated to a temperature of 90° C. so as to cause a reaction for three hours (self-condensation reaction), but the self-condensation reaction of the furfuryl alcohol did not take place.

Comparative Example 2

A reaction vessel equipped with a thermometer, a stirring device, and a reflux condenser was charged with 3 parts by mass of acetic acid (pKa=4.8), 80 parts by mass of water, and 100 parts by mass of furfuryl alcohol. While the contents in the reaction vessel were stirred, the contents were heated to a temperature of 90° C. so as to cause a reaction for three hours (self-condensation reaction), whereby a condensation resin of furfuryl alcohol having a weight-average molecular weight of 400 was obtained. Then, 10 parts by mass of the 5% aqueous solution of gum arabic, 10 parts by mass of a 10% aqueous solution of phosphoric acid, and 1.5 parts by mass of water were added to the reaction product in the reaction vessel. The contents in the reaction vessel were heated to a temperature of 95° C. so as to cause a reaction for three hours (curing reaction), but the contents were not sufficiently cured.

furfuryl alcohol resin in the nitrogen atmosphere, and the spherical activated carbon having a large specific surface area was obtained by activating the spherical carbon particles.

The invention claimed is:

1. A process for producing spherical particles of furfuryl alcohol resin, comprising the steps of:
performing a self-condensation reaction to furfuryl alcohol in the presence of a first acid catalyst to provide a fluidic condensation resin of furfuryl alcohol; and
granulating and curing the condensation resin of furfuryl alcohol, using water as a reaction medium in the presence of a dispersion stabilizer and a second acid catalyst

TABLE 1

| | | | Examples | | | | | |
|---|---|---|---|---|---|---|---|---|
| | | | 1 | 2 | 3 | 4 | 5 | 6 |
| Content [Parts by mass] | furfuryl alcohol | | 100 | 100 | 100 | 100 | 100 | 100 |
| | acid catalyst (a)* | dodecylbenzene sulfonic acid (−2) | 0.15 | — | — | — | — | — |
| | | oxalic acid (1.2) | — | 0.2 | 0.2 | 0.2 | 0.2 | 0.2 |
| | | 89% phosphoric acid (2.2) | — | — | — | — | — | — |
| | | acetic acid (4.8) | — | — | — | — | — | — |
| | water | | 80 | 80 | 80 | 80 | 80 | 80 |
| molecular weight of FA resin | | | 6700 | 570 | 570 | 570 | 350 | 570 |
| Content [Parts by mass] | acid catalyst (b)* | 10% para toluene sulfonic acid (−2.8) | — | 15 | — | — | — | — |
| | | 10% dodecylbenzene sulfonic acid (−2) | 2.5 | — | 2.5 | 5 | 10 | 2.5 |
| | | 10% phosphoric acid (2.2) | — | — | — | — | — | — |
| | dispersion stabilizer | 5% gum arabic | 10 | 40 | 1 | 0.8 | 20 | — |
| | | 5% hydroxyethyl cellulose | — | — | — | — | — | 20 |
| | | 5% polyvinyl alcohol | — | — | — | — | — | — |
| | | nonionic surfactant | — | — | — | — | — | — |
| | water | | 8.25 | 18.5 | 16.8 | 14.74 | 392 | 8.75 |
| particle diameter ($D_{50}$) [μm] | | | 604 | 262 | 1050 | 1263 | 35 | 400 |
| actual carbon ratio [%] | | | 51 | 53 | 52 | 52 | 51 | 50 |
| specific surface area [$m^2/g$] | | | 1317 | 1365 | 1308 | 1451 | 1433 | 1331 |

| | | | Examples | | | | Comparative Examples | |
|---|---|---|---|---|---|---|---|---|
| | | | 7 | 8 | 9 | 10 | 1 | 2 |
| Content [Parts by mass] | furfuryl alcohol | | 100 | 100 | 100 | 100 | 100 | 100 |
| | acid catalyst (a)* | dodecylbenzene sulfonic acid (−2) | — | — | — | — | — | — |
| | | oxalic acid (1.2) | 0.2 | 0.2 | — | — | — | — |
| | | 89% phosphoric acid (2.2) | — | — | 0.56 | — | — | — |
| | | acetic acid (4.8) | — | — | — | 3 | — | 3 |
| | water | | 80 | 80 | 79.94 | 80 | 80 | 80 |
| molecular weight of FA resin | | | 570 | 250 | 450 | 400 | 98 | 400 |
| Content [Parts by mass] | acid catalyst (b)* | 10% para toluene sulfonic acid (−2.8) | — | — | — | — | condensation resin was not obtained | — |
| | | 10% dodecylbenzene sulfonic acid (−2) | 2.5 | 200 | 2.5 | 2.5 | | — |
| | | 10% phosphoric acid (2.2) | — | — | — | — | | 10 |
| | dispersion stabilizer | 5% gum arabic | — | — | 10 | 10 | | 10 |
| | | 5% hydroxyethyl cellulose | — | — | — | — | | — |
| | | 5% polyvinyl alcohol | 20 | — | — | — | | — |
| | | nonionic surfactant | — | 40 | — | — | | — |
| | water | | 8.75 | 240 | 8.25 | 8.25 | | 1.5 |
| particle diameter ($D_{50}$) [μm] | | | 410 | 150 | 290 | 140 | — | uncured |
| actual carbon ratio [%] | | | 50 | 51 | 53 | 50 | — | — |
| specific surface area [$m^2/g$] | | | 1350 | 1389 | 1402 | 1366 | — | — |

* Values in parentheses are pKa values

As apparent from Table 1, the spherical particles of furfuryl alcohol resin produced in Examples 1 to 10 according to the process of the present invention have a volume average diameter ($D_{50}$) in a wide range of 1-1500 μm, and can be obtained as the desired spherical particles of furfuryl alcohol resin. On the other hand, in Comparative Example 1 in which the acid catalyst (a) was not used, the self-condensation reaction did not take place. Further, in Comparative Example 2 in which an acid catalyst having a pKa of not more than 1.5 was not used as the acid catalyst (b), the resin was agglomerated, and the intended spherical particles of furfuryl alcohol resin could not be obtained.

Further, the spherical carbon particles were obtained with a high yield ratio by firing the obtained spherical particles of having a pKa of not more than 1.5, to provide the cured spherical particles of furfuryl alcohol resin.

2. The process for producing spherical particles of furfuryl alcohol resin according to claim 1, wherein the first acid catalyst used in the self-condensation reaction has a pKa of less than 8.

3. The process for producing spherical particles of furfuryl alcohol resin according to claim 1, wherein the first acid catalyst is used in an amount of 0.1-50% by mass with respect to an amount of the furfuryl alcohol.

4. The process for producing spherical particles of furfuryl alcohol resin according to claim 1, wherein the condensation resin of furfuryl alcohol has a weight-average molecular weight of 150-100000.

5. The process for producing spherical particles of furfuryl alcohol resin according to claim 1, wherein an amount of the dispersion stabilizer is 0.01-100% by mass with respect to an amount of furfuryl alcohol used in the self-condensation reaction.

6. The process for producing spherical particles of furfuryl alcohol resin according to claim 1, wherein the dispersion stabilizer is a protective colloid or a surfactant.

7. The process for producing spherical particles of furfuryl alcohol resin according to claim 6, wherein the protective is at least one of hydroxyethyl cellulose, partially hydrolyzed polyvinyl alcohol, and gum arabic.

8. The process for producing spherical particles of furfuryl alcohol resin according to claim 1, wherein an amount of the second acid catalyst is 0.05-100% by mass with respect to the furfuryl alcohol used in the self-condensation reaction.

9. The process for producing spherical particles of furfuryl alcohol resin according to claim 1, wherein the second acid catalyst is benzenesulfonic acid.

10. The process for producing spherical particles of furfuryl alcohol resin according to claim 9, wherein the benzenesulfonic acid is alkylbenzene sulfonic acid.

11. The process for producing spherical particles of furfuryl alcohol resin according to claim 1, wherein the spherical particles of furfuryl alcohol resin has an average particle diameter of 1-1500 μm.

12. The process for producing spherical particles of furfuryl alcohol resin according to claim 1, wherein a reaction medium of the self-condensation reaction is not more than 25 times by mass of water with respect to an amount of the furfuryl alcohol.

13. The process for producing spherical particles of furfuryl alcohol resin according to claim 1, wherein an amount of water is used as the reaction medium for curing is 0.5-25 times by mass with respect to an amount of furfuryl alcohol used in the self-condensation reaction.

14. The process for producing spherical particles of furfuryl alcohol resin according to claim 1, wherein a reaction temperature employed for curing is not lower than 50° C.

15. The process for producing spherical particles of furfuryl alcohol resin according to claim 1, wherein a reaction temperature employed during the self-condensation reaction is not lower than 30° C.

\* \* \* \* \*

UNITED STATES PATENT AND TRADEMARK OFFICE
CERTIFICATE OF CORRECTION

PATENT NO.         : 9,040,656 B2
APPLICATION NO.    : 13/961349
DATED              : May 26, 2015
INVENTOR(S)        : Yasuhiro Matsumoto and Yuta Murai It is certified that error appears in the above-identified patent and that said Letters Patent is hereby corrected as shown below:

Title Page, Item (72), Inventors

Please change: "Yasuhiro Matsumoto, Aichi (JP), Yuta Murai, Inuyama (JP)" to -- Yasuhiro Matsumoto, Niwa-Gun (JP), Yuta Murai, Inuyama (JP) --

Title Page, Foreign Patent Documents

Please change: "JP 2532695 *12/2012" to -- EP 2532695 * 12/2012 --

Signed and Sealed this
Twenty-seventh Day of October, 2015

Michelle K. Lee
*Director of the United States Patent and Trademark Office*